United States Patent
Frederickson (10) Patent No.: US 7,958,801 B2
(45) Date of Patent: Jun. 14, 2011

(54) HARMONIC FORCE GENERATOR FOR AN ACTIVE VIBRATION CONTROL SYSTEM

(75) Inventor: Kirk Charles Frederickson, Seymour, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 213 days.

(21) Appl. No.: 10/676,775

(22) Filed: Oct. 1, 2003

(65) Prior Publication Data

US 2005/0075210 A1 Apr. 7, 2005

(51) Int. Cl.
*F16C 15/00* (2006.01)
*F16F 15/32* (2006.01)
*B07B 1/44* (2006.01)
*B64C 1/40* (2006.01)
*B64C 23/00* (2006.01)

(52) U.S. Cl. ........ 74/572.2; 74/572.4; 209/367; 244/1 N (58) Field of Classification Search .................. 475/331, 475/189; 74/61, 87, 84 S, 572.2, 572.4, 574.1; 244/17.11, 1 N; 310/328; 416/23; 318/254; 307/10.1

See application file for complete search history.

(56) References Cited

U.S. PATENT DOCUMENTS

| | | | | |
|---|---|---|---|---|
| 2,309,172 A | * | 1/1943 | De Kanski | 209/367 |
| 2,688,896 A | * | 9/1954 | Tripp | 356/145 |
| 3,913,409 A | * | 10/1975 | Opderbeck | 74/61 |
| 3,958,471 A | * | 5/1976 | Muller | 82/1.11 |
| 4,241,615 A | * | 12/1980 | Ryan | 74/61 |
| 4,819,182 A | | 4/1989 | King et al. | |
| 5,005,439 A | | 4/1991 | Jensen et al. | |
| 5,091,679 A | | 2/1992 | Murty et al. | |
| 5,167,163 A | * | 12/1992 | McMahon | 74/84 S |
| 5,231,336 A | | 7/1993 | van Namen | |
| 5,310,137 A | | 5/1994 | Yoerkie, Jr. et al. | |
| 5,347,884 A | | 9/1994 | Garnjost et al. | |
| 5,505,282 A | | 4/1996 | Olgac | |
| 5,682,069 A | | 10/1997 | Phillips et al. | |
| 5,833,567 A | * | 11/1998 | Fernandez | 475/255 |
| 5,853,144 A | | 12/1998 | Vincent | |
| 5,884,736 A | | 3/1999 | Burdisso et al. | |
| 5,903,077 A | | 5/1999 | Garnjost et al. | |
| 5,906,254 A | | 5/1999 | Schmidt et al. | |
| 5,990,583 A | | 11/1999 | Nanba et al. | |
| 6,002,778 A | | 12/1999 | Rossettie et al. | |

(Continued)

OTHER PUBLICATIONS

Jolly, Mark R., Bender, Jonathan W. Bender and Carlson, J. David, Properties and Applications of Commerical Magnetorheological Fluids, Thomas Lord Research Center, Cary, NC.

(Continued)

*Primary Examiner* — Vinh T. Luong
(74) *Attorney, Agent, or Firm* — Carlson Gaskey & Olds P.C.

(57) ABSTRACT

A force generator for an active vibration control (AVC) system provides a mass located upon an inner circular member which is movable within an outer circular member to simultaneously complete one revolution about its axis as it orbits within the outer circular member to compensate for sensed vibrations. A crank mounts the inner circular member and a counterweight. The crank is rotated by a prime mover such as an electric motor. The mass will therefore generate a sinusoidal inertial force in a straight line. Multiple systems are suitably arranged to be used in conjunction with one another to provide a wide range of inertial force outputs.

13 Claims, 12 Drawing Sheets

U.S. PATENT DOCUMENTS

| | | |
|---|---|---|
| 6,009,985 A | 1/2000 | Ivers |
| 6,105,943 A | 8/2000 | Nagasawa |
| 6,776,580 B2 * | 8/2004 | Fink et al. ........................ 416/23 |
| 6,806,621 B2 * | 10/2004 | Heim et al. .................... 310/328 |
| 7,198,223 B2 * | 4/2007 | Phelps et al. ................ 244/17.11 |
| 7,201,693 B2 * | 4/2007 | Miller et al. ................... 475/189 |
| 2002/0117579 A1 * | 8/2002 | Kotoulas et al. ............... 244/1 N |
| 2005/0052080 A1 * | 3/2005 | Maslov et al. ................ 307/10.1 |
| 2005/0184689 A1 * | 8/2005 | Maslov et al. ................. 318/254 |

OTHER PUBLICATIONS

Chain Drives, Fundamentals of Mechanical Design, pp. 338-340.

\* cited by examiner

IMPROVED HARMONIC FORCE GENERATOR
EQUATIONS OF MOTION

OUTER CIRCLE WITH CENTER a AND RADIUS R
INNER CIRCLE WITH CENTER o AND RADIUS r $R = 2r$

CIRCUMFERENCE OF INNER CIRCLE:
$c = 2\pi r$

CIRCUMFERENCE OF OUTER CIRCLE:
$C = 2\pi R = 2c$

INNER CIRCLE ROLLS AROUND INSIDE THE
OUTER CIRCLE WITH ANGULAR VELOCITY $\Omega$

AS INNER CIRCLE COMPLETES ONE ORBIT,
IT SIMULTANEOUSLY COMPLETES ONE
REVOLUTION ABOUT ITS CENTER.
THEREFORE THE ANGULAR VELOCITIES OF RADII
ao AND op ARE IDENTICAL.

POSITION OF POINT p ALONG Y AXIS:
$Y_o = r \sin \theta = r \sin \Omega t$
$Y_p = 2r \sin \Omega t$

VELOCITY OF POINT p:
$\dot{Y}_p \text{ (dot)} = 2r\Omega \cos \Omega t$

ACCELERATION OF POINT p:
$\ddot{Y}_p \text{ (ddot)} = -2r\Omega^2 \sin \Omega t$

INERTIAL FORCE GENERATED BY a MASS AT p:
$F = ma$
$F = mR\Omega^2 \sin \Omega t$

2-CUSP HYPOCYCLOID (A STRAIGHT LINE)

HARMONIC FORCE GENERATOR FOR AN ACTIVE VIBRATION CONTROL SYSTEM

BACKGROUND OF THE INVENTION

The present invention relates to producing large, controllable, vibratory forces to compensate for sensed noise or vibrations, and more particularly to a force generator which is part of an active vibration control (AVC) system for an aircraft.

The dominant source of vibration in a helicopter is that generated by the main rotor system at the blade passing frequency (rotation rate times the number of rotor blades). Forces and moments are transmitted usually through the transmission via fuselage attachments, to produce vibration in the fuselage.

One conventional approach to reducing such vibration involves replacing a rigid gearbox mounting strut with a compliant strut and parallel hydraulic actuator. A controller commands the actuators such that the gearbox is selectively vibrated to produce inertial forces which minimize fuselage vibrations. Although effective, this approach is inadequate in a vehicle having a gearbox which is directly attached to the airframe i.e., without struts.

Another conventional approach utilizes force generators consisting of counter-rotating eccentric masses that rotate at the frequency of the primary aircraft vibration and generate a fixed magnitude vibration force. A second pair of eccentric masses is phased relative to the first pair to yield any force magnitude from zero to maximum force. This system, although effective for direct gearbox mounting, requires a parasitic mass of considerable magnitude which may result in an unacceptable weight penalty.

Accordingly, it is desirable to provide an active vibration control system which generates relatively large controllable vibratory forces with a lower weight and smaller size than conventional systems.

SUMMARY OF THE INVENTION

The force generator according to the present invention provides a mass located near the periphery of a circular member which is movable to simultaneously complete one revolution about its axis as it orbits within an outer circular member to create an inertial force to compensate for sensed vibrations. A crank drives the inner circular member and a counterweight. The crank is rotated by a prime mover such as an electric motor.

As the inner circular member diameter is one half of the outer circular member diameter, a mass on the circumference of the inner circular member traces a two cusp hypocycloid (a straight line). If the inner circular member moves with constant angular velocity, the mass on the circumference moves with a simple harmonic motion. The mass will therefore generate a sinusoidal inertial force in a straight line. Multiple systems are to be used in conjunction with one another to provide a wide range of inertial force outputs. Such a smooth sinusoidal vibratory force output is particularly suitable for the compensation of helicopter main rotor vibrations.

The present invention therefore provides a force generator which generates relatively large controllable vibratory forces with a lower weight and smaller size than conventional systems.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
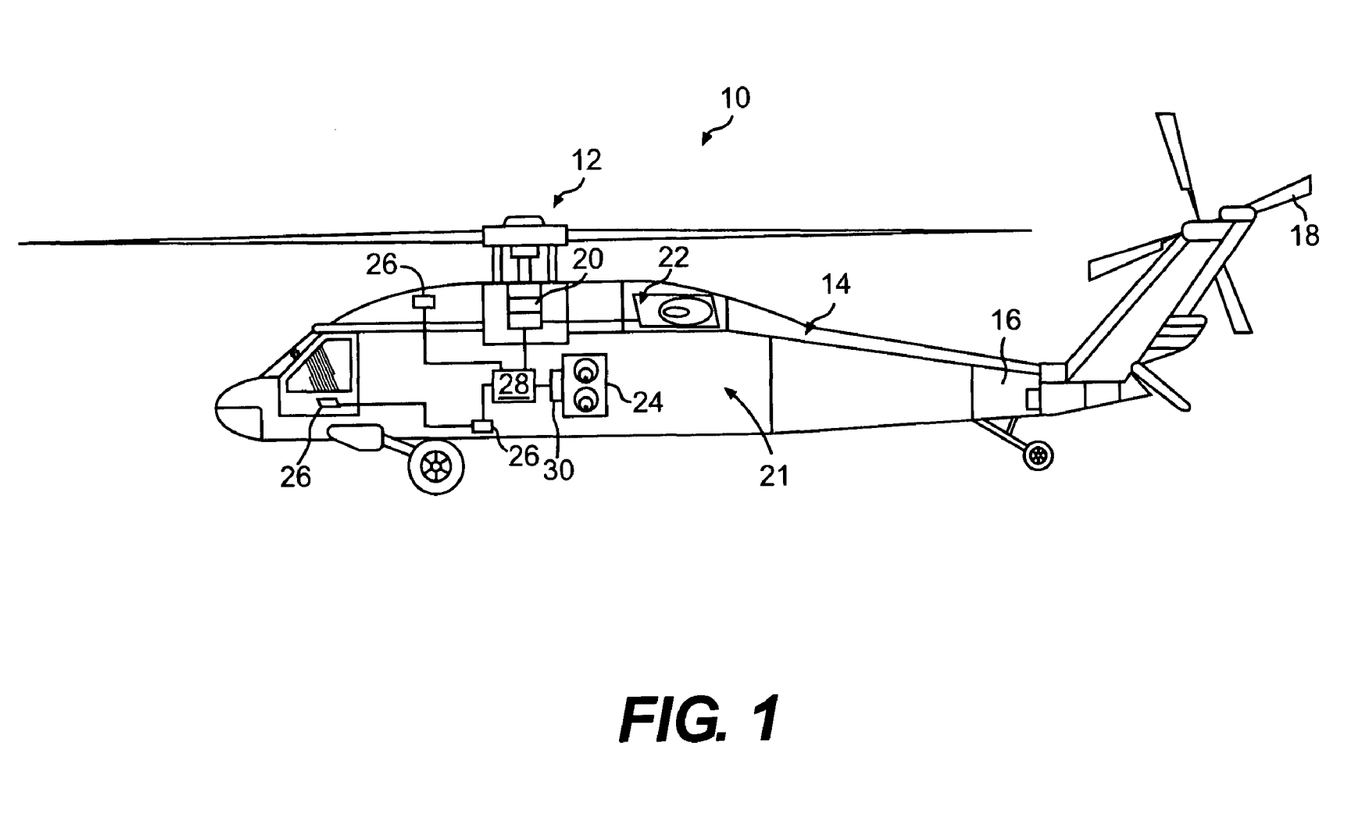
FIG. 1 is a general view of an exemplary rotary wing aircraft embodiment for use with the present invention.

FIG. 1 schematically illustrates an aircraft 10 having a main rotor assembly 12. The aircraft 10 includes a fuselage 14 having an extending tail 16 which mounts an anti-torque rotor 18. Although a particular helicopter configuration is illustrated in the disclosed embodiment, other machines will also benefit from the present invention.

The main rotor assembly 12 is driven through a transmission (illustrated schematically at 20) by one or more engines 22. Vibrations from the rotating main rotor assembly 12, transmission 20, and the engines 22 are thus transmitted to the helicopter fuselage 14. This vibration transmission is particularly manifest in rigid gearbox mounted systems.

An active vibration control (AVC) system 21 includes one or more force generators 24 mounted within the fuselage 14, however, there are numerous locations within the aircraft 10 for locating the force generators 24. A plurality of sensors 26 are mounted at various locations and communicate with a processor 28. The sensors 26 are preferably mounted in the cockpit or cabin areas adjacent to crew or passenger stations. The sensors 26 are preferably accelerometers which generate signals representative of dynamic changes at selected locations as the main rotor assembly 12 rotates. The processor 28 generates output signals to operate a power source 30 such as an electric motor, air motor, hydraulic motor, turbine or the like. The power source 30 operates to control the phase and magnitude characteristics of the force generator(s) 24 in response to the processor 28.

In operation, vibratory forces are produced by the main rotor assembly 12 due, for example, to asymmetric air flow in forward flight. Such vibratory forces arising as the main rotor assembly 12 rotates are, in the absence of any compensating systems, transmitted from the rotor 12 to the fuselage 14. Operation of the force generator(s) 24 is continuously varied by the processor 28 to cater to changing dynamic characteristics such that vibratory forces caused by the rotor assembly 12 and/or other vibratory sources are reduced or eliminated.

Figure 2A:
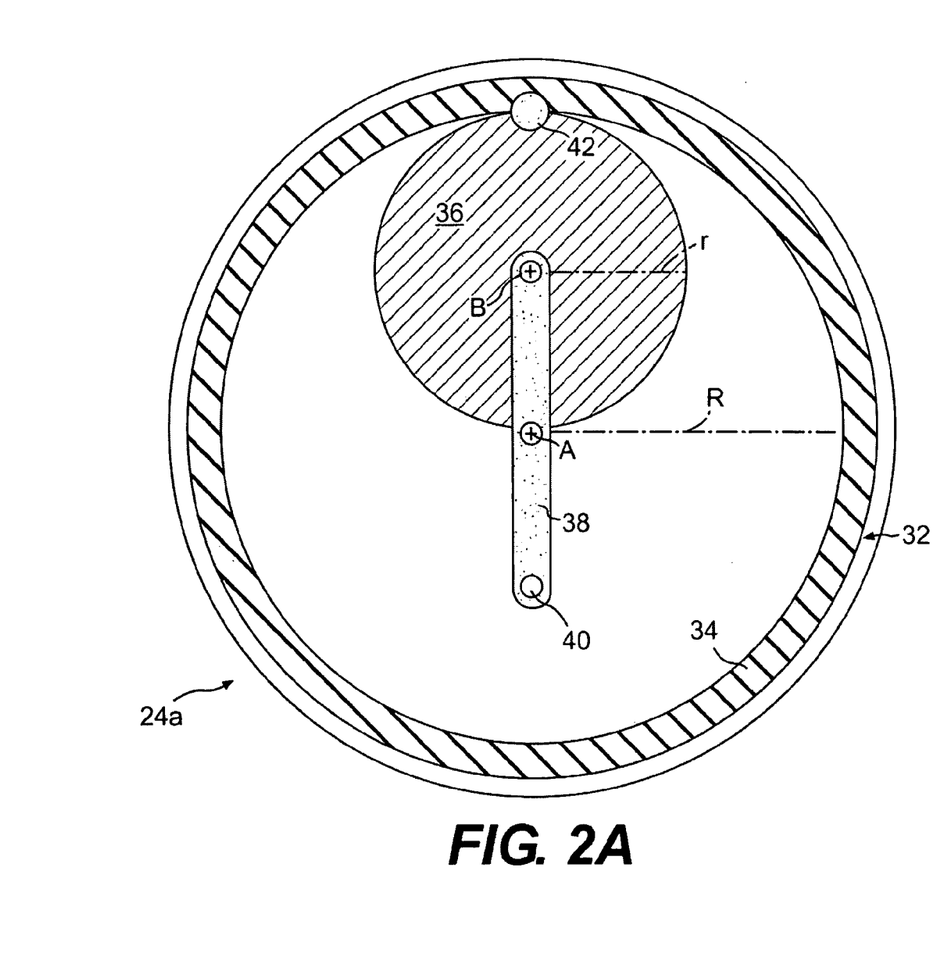
FIG. 2A is a general face view of a force generator according to the present invention.
Figure 2B:
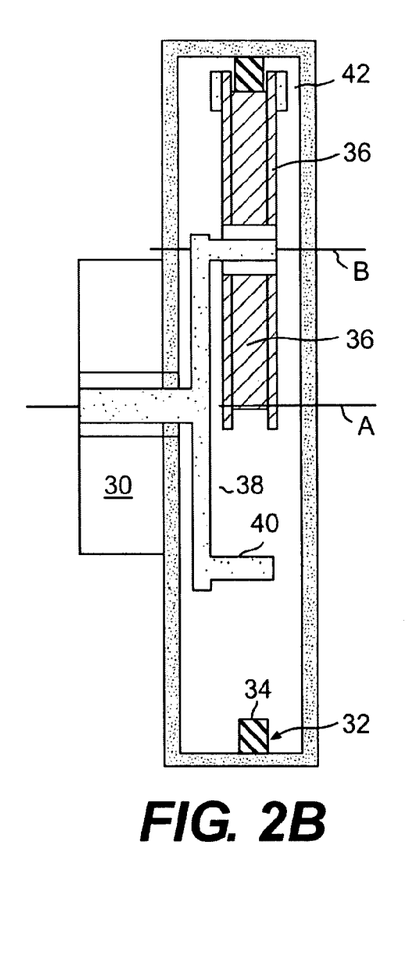
FIG. 2B is a general side view of the force generator of FIG. 2A.
Figure 6A:
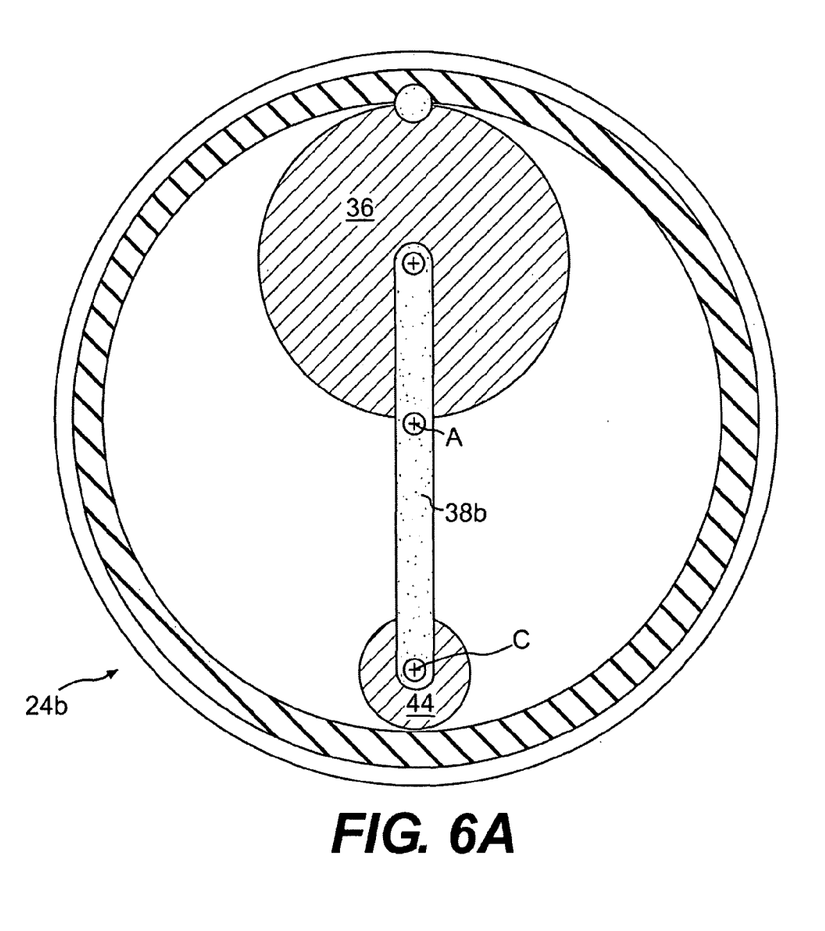
FIG. 6A is a general face view of a force generator according to the present invention.
Figure 6B:
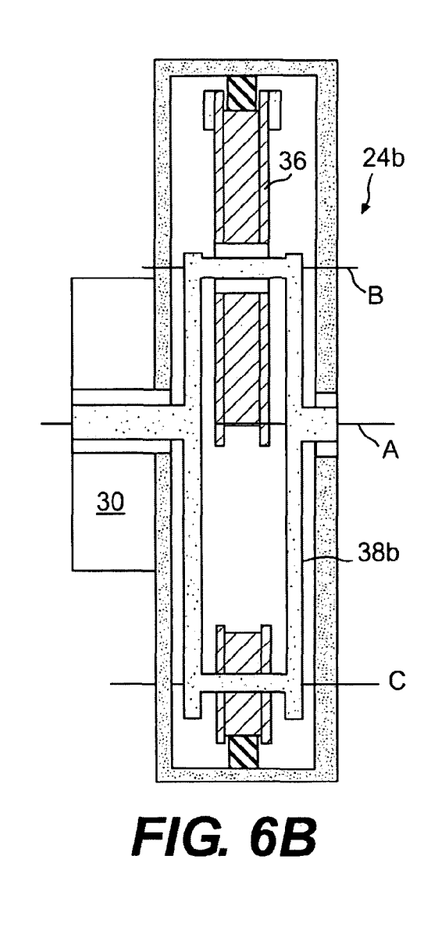
FIG. 6B is a general side view of the force generator of FIG. 6A.

FIGS. 2 and 6 illustrate devices that generate sinusoidal forces of constant magnitude at a given operating speed. In practice, an active vibration control (AVC) system utilizes pairs of such devices, individually phase controlled, to generate specified forces with magnitudes between zero and twice the magnitude of each device. FIGS. 7 through 12 illustrate configurations of controllable force generators, each comprising a pair of the mechanisms described in FIGS. 2 through 6.

Referring to FIG. 2A, a force generator 24a is illustrated. A first circular member 32 is defined about a first axis of rotation A to define a first inner diameter 34 and a first radius R. The first circular member 32 is preferably a ring gear with the ring gear pitch circle as the first inner diameter 34.

A second circular member 36 is defined about a second axis B to define a second radius r. The second radius r is one-half the first radius R. The second circular member 36 is preferably a planet gear engaged with the first circular member 32. The second circular member 36 is movable to simultaneously complete one revolution about the second axis B and one orbit around the first axis A.

Figure 3:
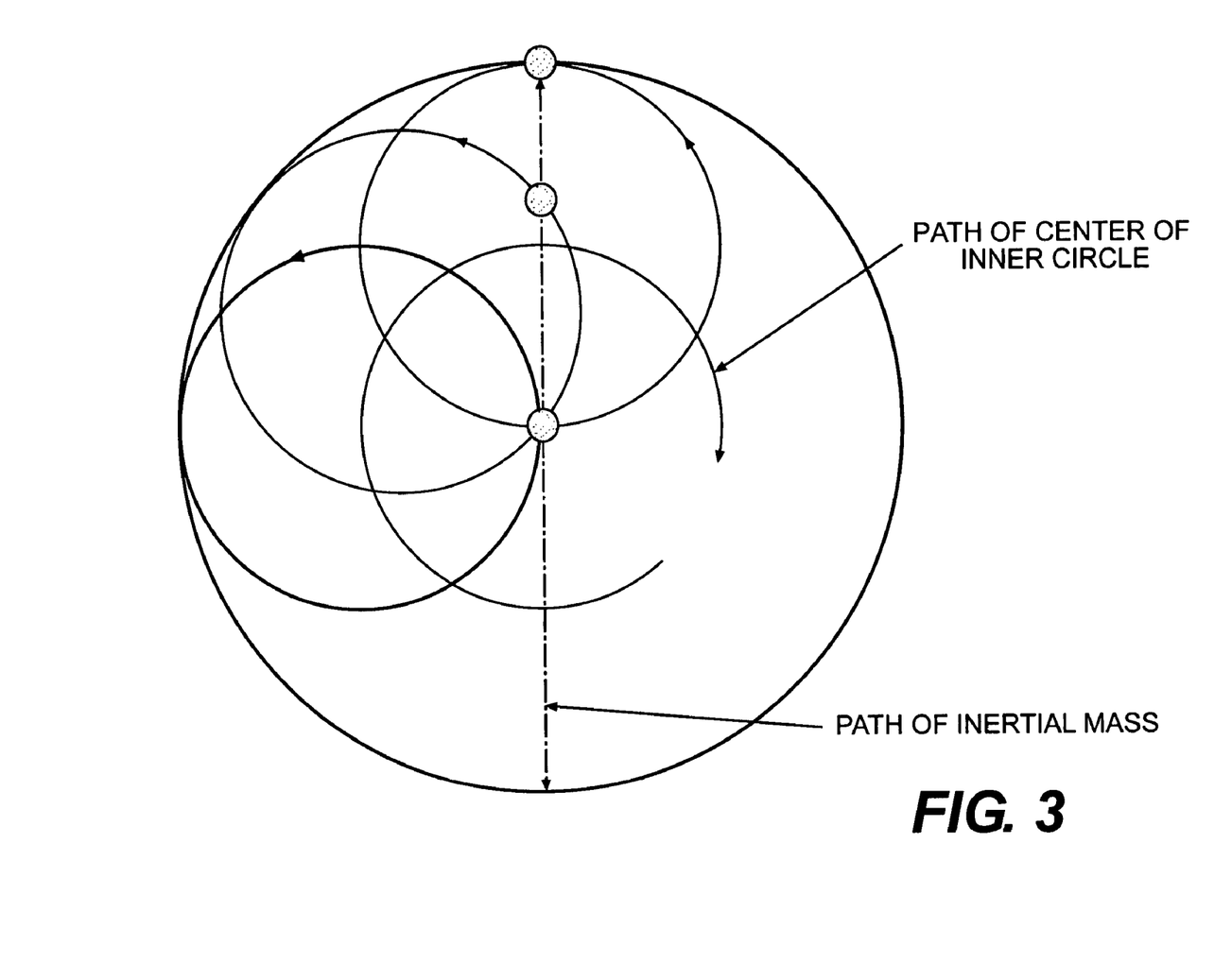
FIG. 3 is a schematic view of a mass movement in accordance with the present invention.

A crank 38 (also illustrated in FIG. 2B) mounts the second circular member 36. The crank 38 rotates about the first axis A and supports a counterweight 40. The crank 38 is rotated by the power source 30 (FIG. 2B). The counter weight counters the weight of the second circular member 36. A mass 42 is located at a circumference of the second circular member 34 to generate a vibratory inertial force as the second circular member 36 simultaneously complete one revolution about the second axis B and one orbit around the first axis A to define a two cusp hypocycloid (the geometric principal can be understood by referring to FIG. 3 where the inner circle is shown in several positions).

Figure 4:
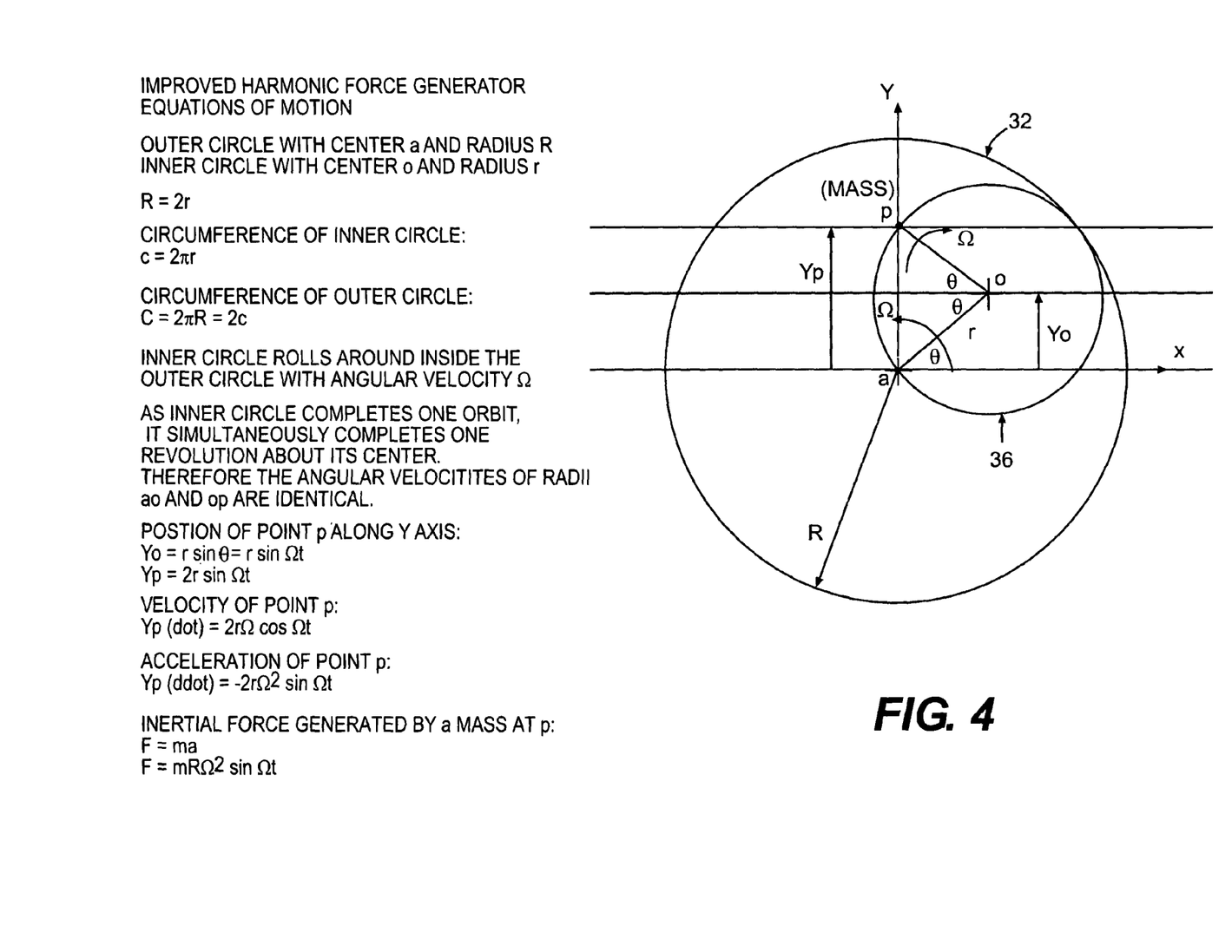
FIG. 4 is a formulaic schematic diagram of a mass movement in accordance with the present invention.
Figure 5A:
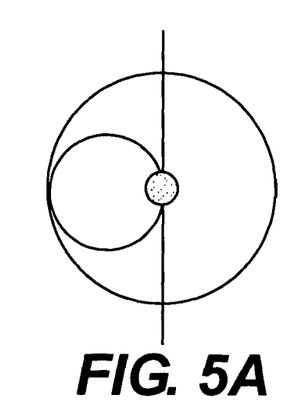
FIGS. 5a-5h are a representative schematic sequence illustrating a mass movement in accordance with the present invention.
Figure 5B:
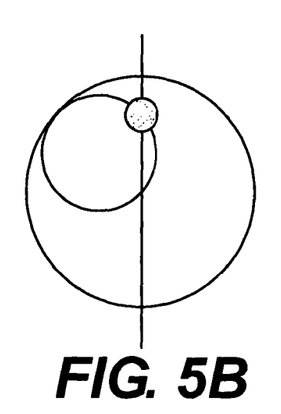
Figure 5C:
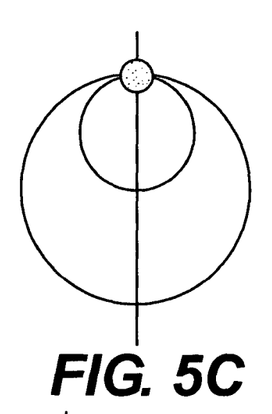
Figure 5D:
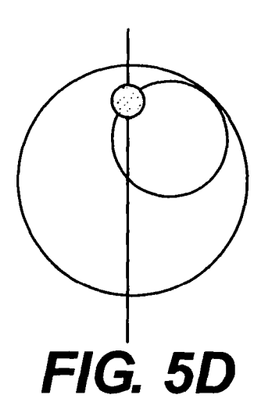
Figure 5E:
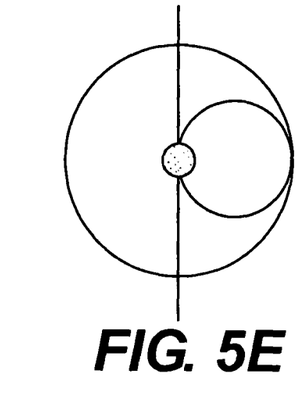
Figure 5F:
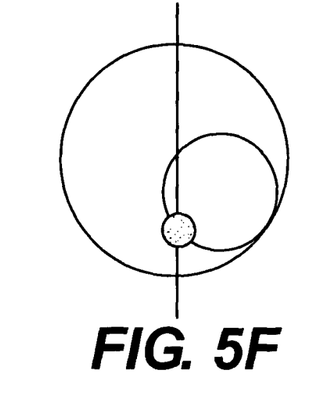
Figure 5G:
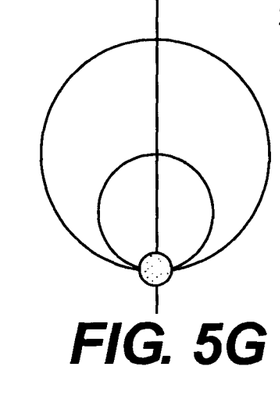
Figure 5H:
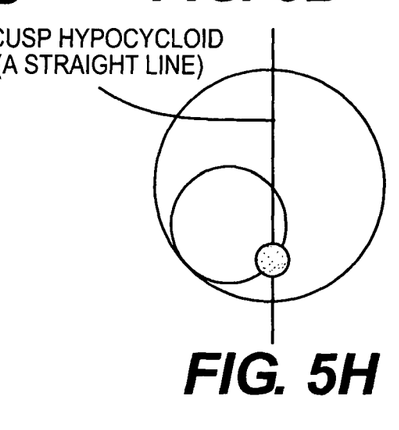

Referring to FIG. 4, the operation of the force generator 24a is formulaically illustrated. The first circular member 32 has center a and radius R while the second circular member 36 has center o and radius r. The members 32, 36 are related by:

$$R=2r$$

The circumference of second circular member 36 is:

$$c=2\pi r$$

The circumference of first circular member 32 is:

$$C=2\pi R=2c$$

The second circular member 36 rolls around the inside of the first circular member 32 with angular velocity $\Omega$. As the second circular member 36 completes one orbit, the second circular member 36 simultaneously completes one revolution about center o. Therefore, the angular velocities of radii ao and op are identical.

The position of mass 42 ($p$) along the Y axis is defined as:

$$Yo=r\sin\Theta=r\sin\Omega t$$

$$Yp=2r\sin\Omega t$$

Velocity of mass 42 ($p$):

$$Yp(dot)=2r\Omega\cos\Omega t$$

The acceleration of mass 42 ($p$):

$$Yp(double\ dot)=-2r\Omega^2\sin\Omega t$$

The inertial force generated by a mass at point p is therefore:

$$F=ma$$

$$F=mR\Omega^2\sin\Omega t$$

Generally, a point such as mass 42 on the circumference of a circle rolling inside another circle traces hypocycloids. If the second circular member 36 diameter is exactly one half of the first circular member 32 diameter, a point on the circumference of the second circular member 36 creates a two cusp hypocycloid which is a straight line. If the second circular member 36 moves with constant angular velocity, the point on the circumference moves with a simple harmonic motion. The mass 42 which is located at point p on the circumference will therefore generate a sinusoidal inertial force in a straight line (further illustrated in FIGS. 5a-5h). Such a smooth sinusoidal vibratory force output is particularly suitable for the compensation of main rotor rotation vibrations.

Referring to FIG. 6A, another force generator 24b is illustrated. A crank 38b (also illustrated in FIG. 6B) mounts the second circular member 36 and an opposed circular counter member 44 about an axis C. The second circular member 36 and the opposed circular counter member 44 both roll within the first circular member 32. That is, the second circular member 36 and the opposed counter member 44 may be planets which orbit within the first circular member 32. The opposed counter member 44 essentially replaces the counterweight 40 of FIGS. 2A, 2B such that a relatively lighter weight system 24b is achieved.

Figure 7:
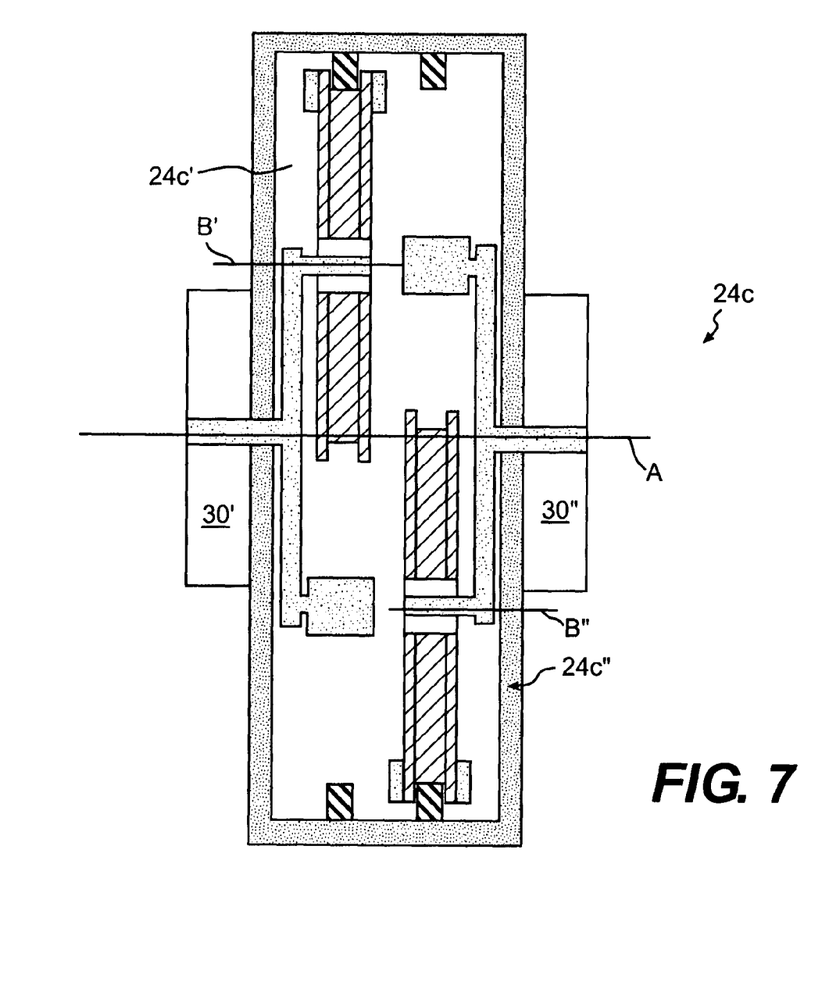
FIG. 7 is another force generator according to the present invention.

Referring to FIG. 7 another force generator 24c is illustrated. The force generator 24c includes a duplicate pair of force generator subsystems 24c' and 24c" driven by separate motors 30' and 30". Multiple systems are suitable arranged to be used in conjunction with one another to provide a wide range of inertial force outputs. Each subsystem 24c' and 24c" is essentially the force generator 24a disclosed in FIGS. 2a and 2B. Individual control of the subsystems 24c' and 24c" allows the force generator 24c to provide a force of specified amplitude, frequency and phase in a single axis.

Figure 8:
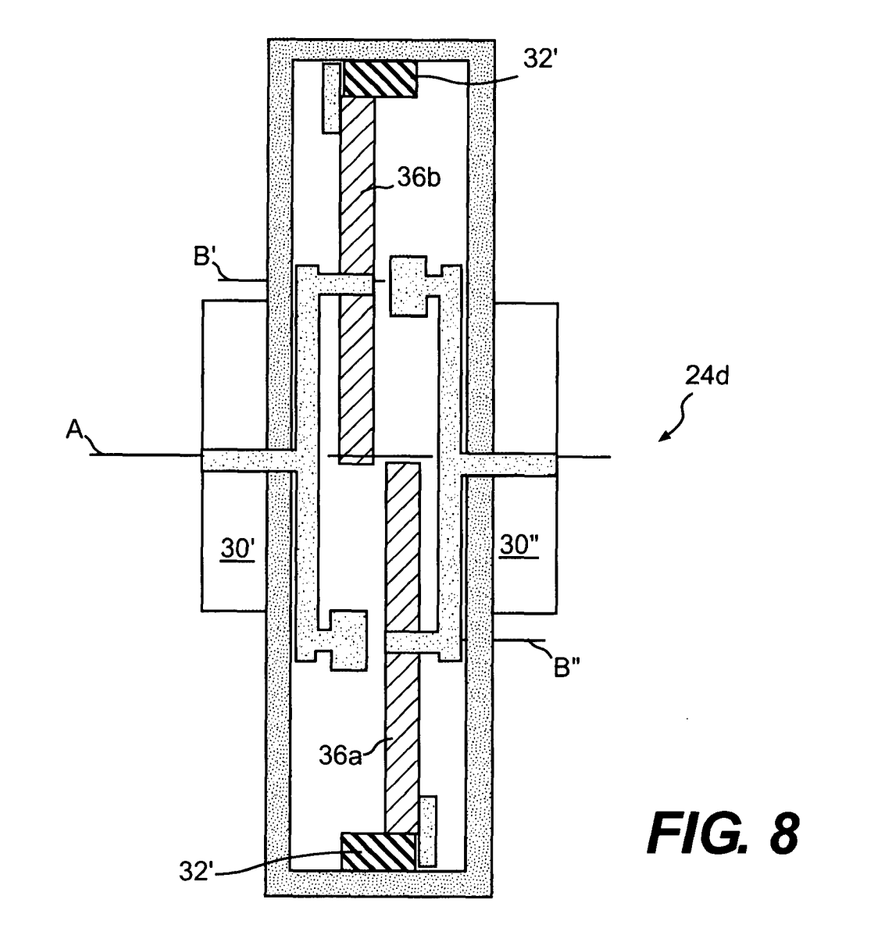
FIG. 8 is another force generator according to the present invention.

Referring to FIG. 8 another force generator 24d is as disclosed in FIG. 7, but with a common first circular member 32'. That is, a single ring gear is utilized to support a multiple of second circular member 36a, 36b planets to provide relatively lightweight and compact arrangement.

Figure 9:
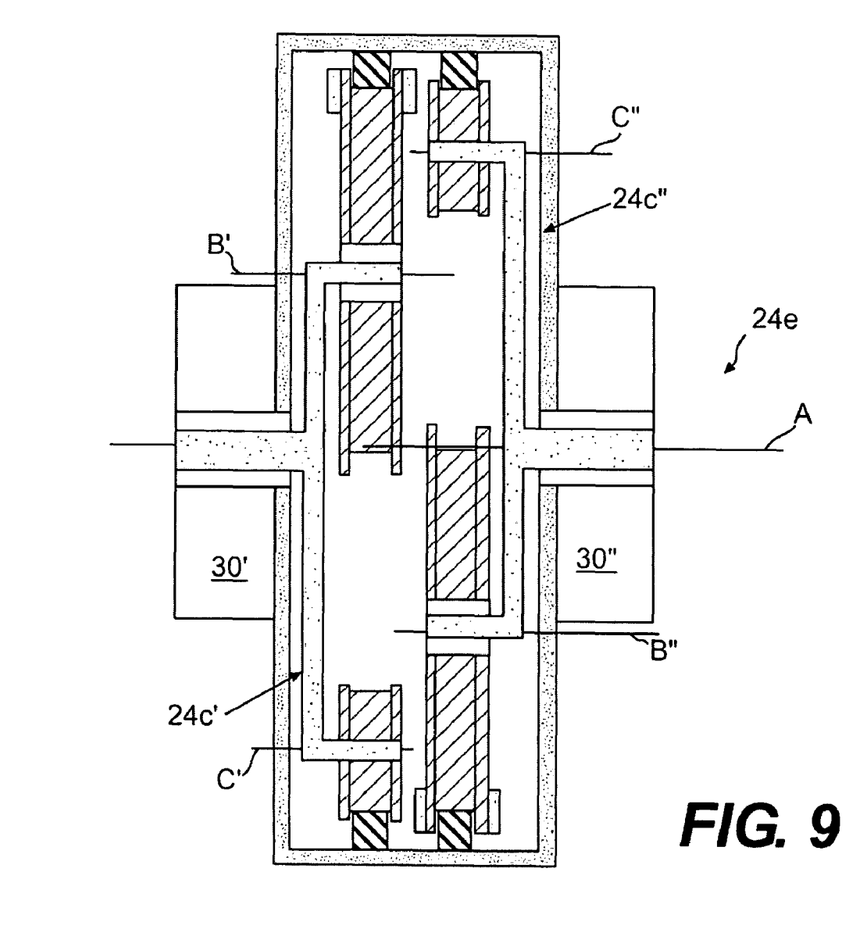
FIG. 9 is another force generator according to the present invention.
Figure 10:
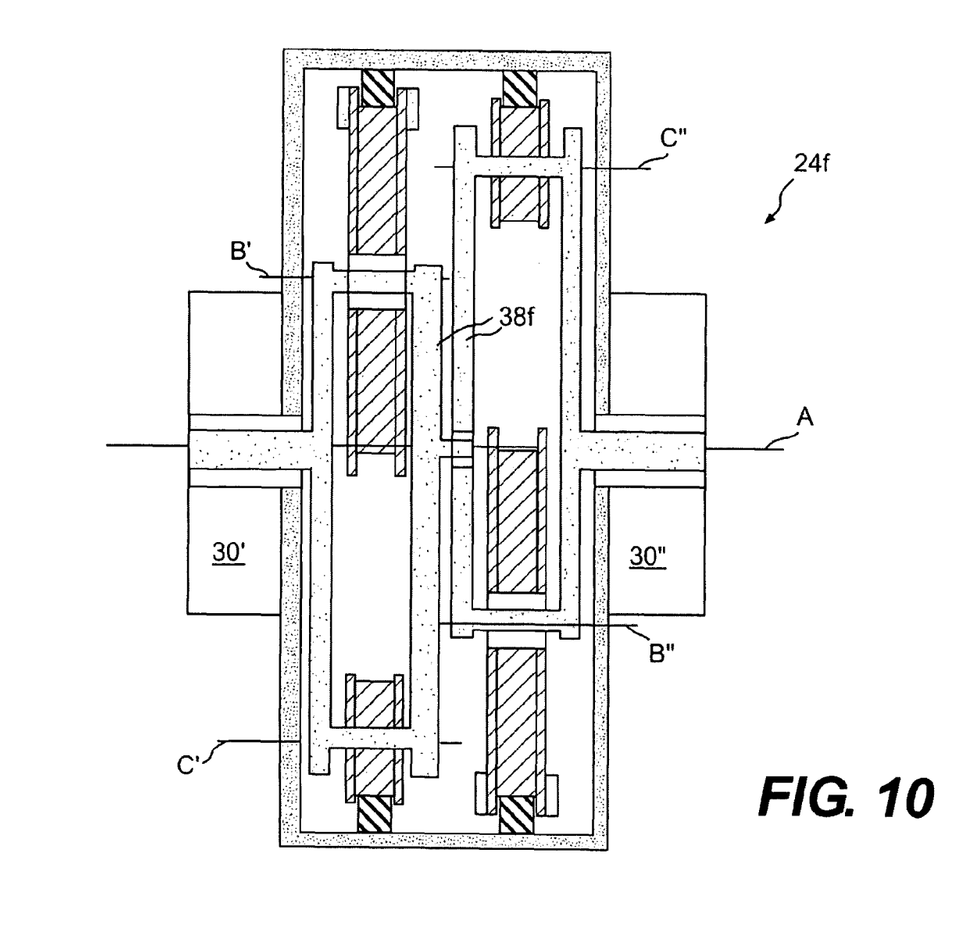
FIG. 10 is another force generator according to the present invention.

Referring to FIG. 9 another force generator 24e is illustrated. The force generator 24e includes a duplicate pair of force generator subsystems 24e' and 24e" driven by separate motors 30' and 30". Each subsystem 24e' and 24e" is essentially the force generator 24b as disclosed in FIGS. 6a and 6B. It should be understood that various crank 38f configurations (FIG. 10) will also benefit from the present invention.

Figure 11:
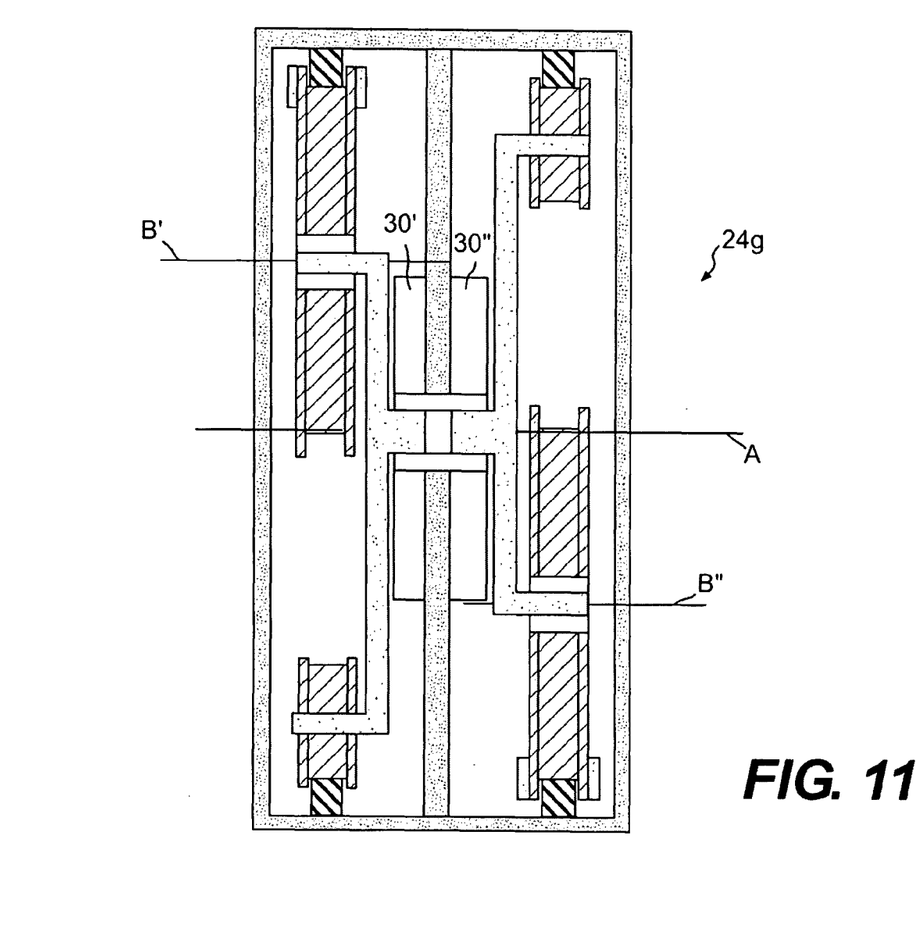
FIG. 11 is another force generator according to the present invention.

Referring to FIG. 11 another force generator 24g is illustrated. The force generator 24g includes a duplicate pair of force generator subsystems 24g' and 24g" driven by separate adjacently located motors 30' and 30".

Figure 12:
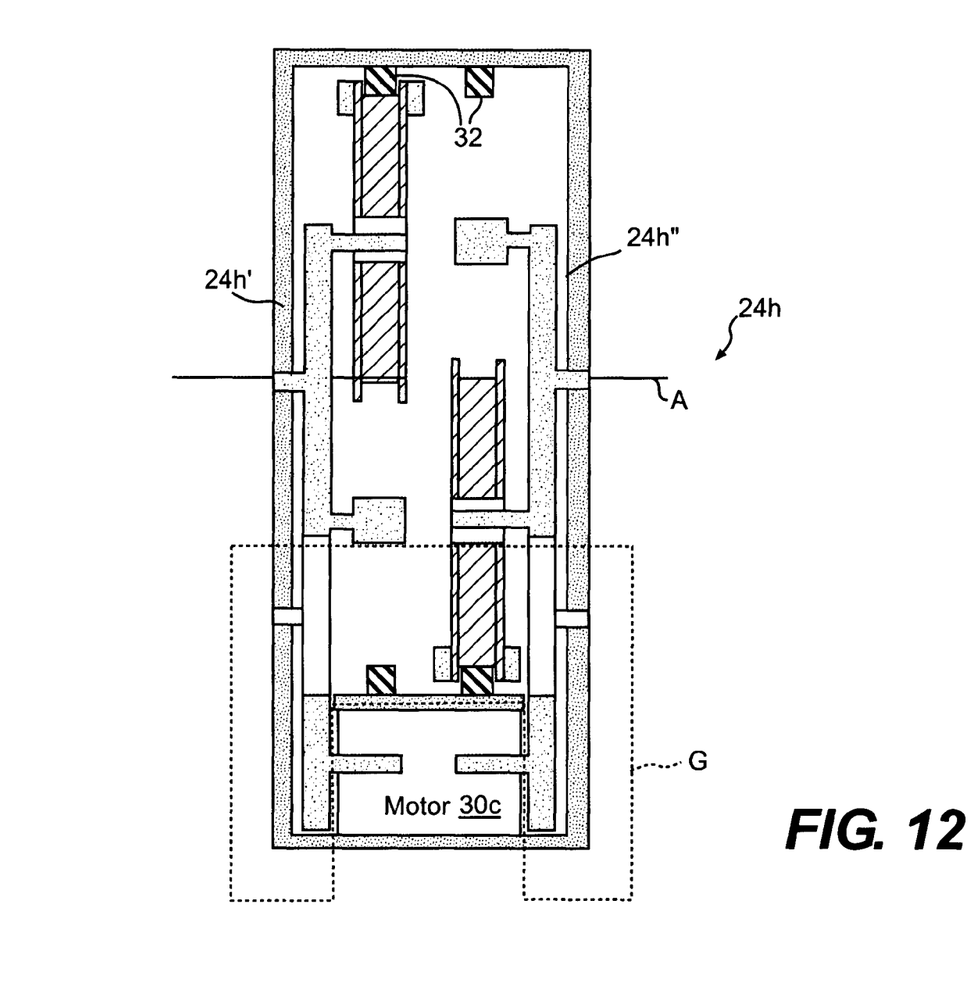
FIG. 12 is another force generator according to the present invention.

Referring to FIG. 12 yet another force generator 24h is illustrated. The force generator 24h includes a duplicate pair of force generator subsystems 24h' and 24h" driven by a remote common motor 30c through a remote gearbox G (illustrated schematically). The remote motor 30c and gearbox G are located outside of the first circular member 32 providing yet another configuration. Other variations in packaging space and layout arrangements will also benefit from the present invention which may be particularly tailored to a desired application or vehicle location.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A force generator comprising:
   a rotationally fixed first circular member defined about a first axis to define a first inner diameter circular path, said first circular member having a first radius;
   a second circular member defined about a second axis offset from said first axis to define a second radius;
   a crank which mounts said second circular member, said crank rotatable about said first axis;
   a mass located adjacent a circumference of said second circular member movable about a two-cusp hypocycloid path to generate a vibratory inertial force;
   a processor;
   a sensor system in communication with said processor; and
   a power source which drives said crank, said processor controls said power source to drive said crank such that a phase and magnitude of the vibratory inertial force is continuously varied to reduce an externally generated vibratory force sensed by said sensor system.

2. The force generator as recited in claim 1, wherein said vibratory inertial force is a sinusoidal inertial force in a straight line.

3. The force generator as recited in claim 1, wherein said rotationally fixed first circular member comprises a ring gear.

4. The force generator as recited in claim 1, wherein said second circular member comprises a planet gear.

5. The force generator as recited in claim 1, further comprising an opposed circular counter member mounted to said crank about a third axis offset from said first axis.

6. The force generator as recited in claim 5, wherein said opposed circular counter member comprises a planet gear in meshed engagement with said first circular member.

7. The force generator as recited in claim 5, wherein said opposed circular counter member comprises a counterweight.

8. The force generator as recited in claim 1, wherein said second radius is one-half the radius of said first radius, said second circular member movable about the circular path to simultaneously complete one revolution about said second axis and one orbit around said first axis.

9. The force generator as recited in claim 1, wherein said power source is an electric motor.

10. The force generator as recited in claim 1, wherein at least one sensor of said sensor system is mounted in a cockpit area.

11. The force generator as recited in claim 1, wherein at least one sensor of said sensor system is mounted in a cabin area.

12. The force generator as recited in claim 1, wherein said sensor system generates signals representative of dynamic changes at selected locations as a main rotor assembly of a rotary wing aircraft rotates.

13. The force generator as recited in claim 12, wherein said phase and magnitude is continuously varied by said processor in response to changing dynamic characteristics in part caused by said rotor assembly.

* * * * *